(12) United States Patent
Westhäuser et al.

(10) Patent No.: US 12,285,995 B2
(45) Date of Patent: Apr. 29, 2025

(54) METHOD FOR INITIATING A DEFROSTING PROCESS OF A HEAT EXHANGER OF A HEAT PUMP OF A MOTOR VEHICLE AND A CORRESPONDING MOTOR VEHICLE

(71) Applicant: Volkswagen Aktiengesellschaft, Wolfsburg (DE)

(72) Inventors: Jochen Westhäuser, Braunschweig (DE); Jan-Christoph Albrecht, Wolfsburg (DE); Sven Twenhövel, Sassenburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 229 days.

(21) Appl. No.: 17/671,154

(22) Filed: Feb. 14, 2022

(65) Prior Publication Data

US 2022/0258567 A1 Aug. 18, 2022

(30) Foreign Application Priority Data

Feb. 15, 2021 (DE) ...................... 10 2021 201 380.5

(51) Int. Cl.
*B60H 1/00* (2006.01)
(52) U.S. Cl.
CPC ..... *B60H 1/00878* (2013.01); *B60H 1/00385* (2013.01); *B60H 1/00735* (2013.01);
(Continued)

(58) Field of Classification Search
CPC ............ B60H 1/00878; B60H 1/00385; B60H 1/00735; B60H 1/00764; B60H 1/00771;
(Continued)

(56) References Cited

U.S. PATENT DOCUMENTS 6,910,345 B2 * 6/2005 Horstmann ............. F25B 40/00
62/324.6
7,003,975 B2 * 2/2006 Feuerecker ............. F25B 41/24
62/278
(Continued)

FOREIGN PATENT DOCUMENTS

DE 10 2014 102078 A1 8/2015
DE 10 2009 052 409 B4 3/2018
(Continued)

OTHER PUBLICATIONS

Search Report for European Patent Application No. 22 15 2254 A, dated Jun. 28, 2022.

*Primary Examiner* — Ljiljana V. Ciric
(74) *Attorney, Agent, or Firm* — PEARL COHEN ZEDEK LATZER BARATZ LLP

(57) ABSTRACT

A method for initiating a defrosting process of a heat exchanger of a heat pump of a motor vehicle, wherein the heat exchanger and a coolant heat exchanger of a cooling circuit of the motor vehicle are arranged in a common air path, involves determining a coolant outlet temperature of a coolant from the coolant heat exchanger, determining a state of icing of the heat exchanger using the coolant outlet temperature, and initiating a defrosting process of the heat exchanger if icing of the heat exchanger is determined.

17 Claims, 1 Drawing Sheet

(52) U.S. Cl.
CPC ..... B60H 1/00764 (2013.01); B60H 1/00771 (2013.01); B60H 1/00807 (2013.01); B60H 1/00899 (2013.01); B60H 2001/00961 (2019.05)

(58) Field of Classification Search
CPC ............ B60H 1/00807; B60H 1/00899; B60H 2001/00961; F25B 30/00; F25B 47/02
See application file for complete search history.

(56) References Cited

U.S. PATENT DOCUMENTS

| | | | | |
|---|---|---|---|---|
| 9,682,611 | B2 * | 6/2017 | Haug | B60H 1/32284 |
| 9,751,381 | B2 * | 9/2017 | Ragazzi | B60H 1/3207 |
| 9,823,009 | B2 * | 11/2017 | Ragazzi | B60H 1/321 |
| 9,914,338 | B2 * | 3/2018 | Nemesh | B60H 1/3208 |
| 10,336,157 | B2 * | 7/2019 | Ragazzi | B60H 1/3207 |
| 10,391,835 | B2 * | 8/2019 | Blatchley | F25B 49/02 |
| 10,486,495 | B2 * | 11/2019 | Porras | B60H 1/00385 |
| 10,514,191 | B2 * | 12/2019 | Liu | B60H 1/004 |
| 10,773,570 | B2 * | 9/2020 | Herbolzheimer | B60H 1/3213 |
| 10,836,236 | B2 * | 11/2020 | Larson | B60H 1/00885 |
| 11,104,203 | B2 * | 8/2021 | Blatchley | B60H 1/00899 |
| 11,110,778 | B2 * | 9/2021 | Semel | F25D 21/06 |
| 11,198,346 | B2 * | 12/2021 | Blatchley | B60H 1/321 |
| 11,772,458 | B2 * | 10/2023 | Westhäuser et al. | B60H 1/00899 62/80 |
| 11,820,203 | B2 * | 11/2023 | Schroeder | F25B 6/04 |
| 2004/0069481 | A1 * | 4/2004 | Ebara | B60H 1/00907 165/231 |
| 2005/0039959 | A1 * | 2/2005 | Fruhauf | B60H 1/00878 429/434 |
| 2016/0209099 | A1 * | 7/2016 | Liu | F25B 49/025 |
| 2018/0208014 | A1 * | 7/2018 | Ben Ahmed | B60H 1/3211 |
| 2018/0208061 | A1 * | 7/2018 | Ben Ahmed | B60H 1/00899 |
| 2020/0353793 | A1 | 11/2020 | Choi et al. | |
| 2021/0252940 | A1 * | 8/2021 | Heyl | B60H 1/3228 |
| 2022/0258566 | A1 * | 8/2022 | Westhäuser | B60H 1/00878 |
| 2022/0258567 | A1 * | 8/2022 | Westhäuser | B60H 1/00878 |
| 2023/0138734 | A1 * | 5/2023 | Westhaeuser | F25B 47/025 62/80 |
| 2023/0382187 | A1 * | 11/2023 | Höfler | B60H 1/32281 |

FOREIGN PATENT DOCUMENTS

| | | | | |
|---|---|---|---|---|
| DE | 102014102078 | B4 * | 9/2021 | ........... B60H 1/0073 |
| DE | 112022001746 | T5 * | 2/2024 | ......... B60H 1/00021 |
| DE | 102020134027 | B4 * | 3/2024 | ......... B60H 1/00907 |
| EP | 563724 | B1 | 9/1996 | |
| EP | 1273467 | A1 | 1/2003 | |
| EP | 2666652 | A1 | 11/2013 | |
| EP | 3736148 | A1 | 11/2020 | |

* cited by examiner

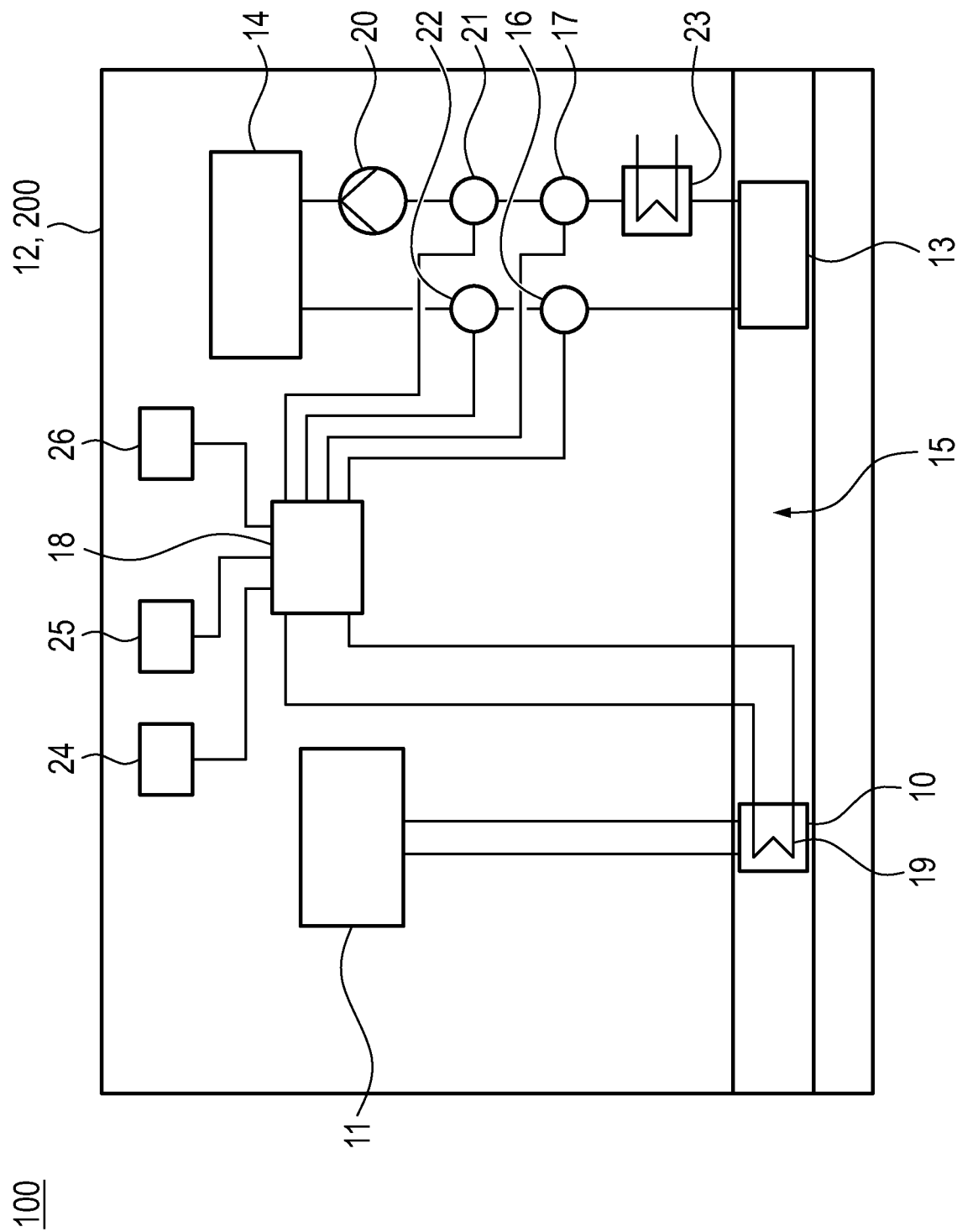

METHOD FOR INITIATING A DEFROSTING PROCESS OF A HEAT EXHANGER OF A HEAT PUMP OF A MOTOR VEHICLE AND A CORRESPONDING MOTOR VEHICLE

CROSS REFERENCE TO RELATED APPLICATION

This application claims priority from German Patent Application No. 10 2021 201 380.5, filed Feb. 15, 2021, which is hereby incorporated by reference in its entirety.

FIELD OF THE INVENTION

The present invention relates to a method for initiating a defrosting process of a heat exchanger of a heat pump of a motor vehicle, in particular of an electric vehicle or a battery-electric vehicle or a hybrid electric vehicle, wherein the heat exchanger and a coolant heat exchanger of a cooling circuit of the motor vehicle are arranged in a common air path.

The present invention also relates to a motor vehicle comprising a device for defrosting a heat exchanger of a heat pump of the motor vehicle, wherein the device has a computing unit.

BACKGROUND OF THE INVENTION

Heat pumps are used in electromobility to heat the vehicle interior. The heat required for heating is taken from the outside air. For this purpose, a heat exchanger of the heat pump, also called an ambient heat exchanger, must be cooled below the ambient temperature. If the outside air falls below its dew point, frost forms on the surface of the heat exchanger, preventing the air from flowing through the heat exchanger. Efficient operation of the heat pump is then no longer ensured.

In order to allow a flow of outside air through the heat exchanger, defrosting cycles are necessary in which the heat exchanger is heated up. During the defrosting cycle, the ice melts and a flow of outside air through the heat exchanger can take place again.

Methods for initiating the defrosting process are known in the prior art, in which methods a decrease in the suction pressure of the heat pump is monitored.

Furthermore, methods are known in which an additional sensor system is used with which the layer thickness of the ice or frost formed on the heat exchanger is measured.

An air/water heat pump having an evaporator is known from DE 10 2009 052 409 B4, a fan and a fan control unit being assigned to the evaporator. The fan control unit detects a current and/or a speed of the fan and determines an operating point of the fan based on the detected current and/or the speed. The fan control unit is designed to monitor the operating point of the fan and to forward a defrost initiation signal to a controller when a threshold value is undershot or exceeded.

EP 0 563 724 B1 discloses a method for determining the formation of ice on an evaporator of a cooling device, the cooling device having a fan driven by an electric motor for air to flow through the evaporator. In the method, the change in an operating parameter of the motor operating the fan is measured.

The disadvantage of the known method, in which the suction pressure of the heat pump of the motor vehicle is monitored, is that the suction pressure can also drop temporarily during the start-up process of the motor vehicle, so that unnecessary defrosting processes may be initiated.

In addition, in the case of known methods for determining the state of icing of a heat exchanger, it can happen that a change in external influences results in icing being determined even though there is no layer of ice on the heat exchanger.

SUMMARY OF THE INVENTION

The present invention is based on the object of providing a method for initiating a defrosting process of a heat exchanger of a heat pump of a motor vehicle, which method is insensitive to external influences and can also be used in combination with other methods.

To achieve the object on which the invention is based, a method for initiating a defrosting process of a heat exchanger of a heat pump of a motor vehicle, in particular of an electric vehicle or a battery-electric vehicle or a hybrid electric vehicle, is proposed, wherein the heat exchanger and a coolant heat exchanger of a cooling circuit of the motor vehicle are arranged in a common air path, wherein a coolant outlet temperature of a coolant from the coolant heat exchanger is determined, wherein it is further provided that a state of icing of the heat exchanger is determined using the coolant outlet temperature, and wherein a defrosting process of the heat exchanger is initiated if icing of the heat exchanger is determined.

The heat exchanger of the heat pump can also be referred to as an ambient heat exchanger. The heat pump is preferably used to heat a passenger compartment of the motor vehicle.

The cooling circuit of the motor vehicle can be a circuit for cooling the electric drive motors and/or the battery of the motor vehicle, in particular the electric vehicle or the battery-electric vehicle or the hybrid electric vehicle.

The heat exchanger or ambient heat exchanger and the coolant heat exchanger are arranged in a common air path, i.e. the ambient air flowing through the heat exchanger on the air side also flows through the coolant heat exchanger.

According to the invention, it is provided that a coolant outlet temperature of a coolant from the coolant heat exchanger is determined, wherein a state of icing of the heat exchanger is determined using the coolant outlet temperature, and wherein a defrosting process of the heat exchanger is initiated if icing of the heat exchanger is determined.

If icing of the heat exchanger or the ambient heat exchanger of the heat pump is present, this results in a decrease in the air mass flow in the air path. If the air mass flow in the air path decreases, the air mass flow through the coolant heat exchanger also decreases. This can result in a change in the coolant outlet temperature of the coolant at the coolant heat exchanger. The coolant outlet temperature can therefore be an indication of the state of icing of the heat exchanger of the heat pump.

The state of icing can be a non-icing state, a slightly iced state, or a heavily iced state. If icing, in particular a slightly or heavily iced state, of the heat exchanger is present, a defrosting process known per se to a person skilled in the art is initiated for the heat exchanger of the heat pump.

By using a coolant outlet temperature of the coolant heat exchanger to determine the state of icing of the heat exchanger of the heat pump, the determination of the icing state of the heat exchanger becomes less sensitive to external influences. In addition, the method according to the invention can be used in combination with other methods, for example known from the prior art, for the determination of the state of icing of the heat exchanger of the heat pump.

The coolant heat exchanger is preferably arranged behind the heat exchanger in the air path in the direction of flow of the air.

Furthermore, it is preferably provided that the state of icing, in particular icing, of the heat exchanger is determined from a change, in particular from an increase, in the coolant outlet temperature.

If the air mass flow in the air path decreases due to icing of the heat exchanger, the cooling performance of the coolant heat exchanger of the cooling circuit for the drive motors or for the battery of the motor vehicle is generally reduced. The coolant outlet temperature from the coolant heat exchanger can therefore increase. If a change, in particular an increase, in the coolant outlet temperature is thus determined, a state of icing of the heat exchanger can be determined from this change in the coolant outlet temperature.

Furthermore, it can preferably be provided that a coolant inlet temperature of the coolant in the coolant heat exchanger is determined, that a coolant temperature difference is determined from the coolant inlet temperature and the coolant outlet temperature, and that the state of icing, in particular icing, of the heat exchanger is determined from a change, in particular from a decrease, in the coolant temperature difference.

In addition to a change, in particular an increase, in the coolant outlet temperature, the coolant temperature difference can thus also be used as an alternative or in parallel to the determination of the state of icing of the heat exchanger. In the event that the coolant outlet temperature increases due to icing of the heat exchanger, the temperature difference also decreases if the coolant inlet temperature remains unchanged, so that the coolant temperature difference also provides an indication of icing of the heat exchanger of the heat pump. In principle, it is also possible for the coolant outlet temperature to remain constant in the case of icing of the heat exchanger of the heat pump, but the coolant inlet temperature decreases due to a current requirement profile. If a coolant temperature difference decreases while the coolant outlet temperature remains approximately constant, this can therefore also be an indication of icing of the heat exchanger.

With a further advantage, it can be provided that a coolant volume flow and/or a performance of a coolant pump of the cooling circuit is determined, and that the coolant volume flow and/or the performance of the coolant pump is used to determine the state of icing of the heat exchanger.

The coolant volume flow and/or the performance of the coolant pump can be used to assess whether a change in the coolant outlet temperature, in particular an increase, and/or a change in the coolant temperature difference, in particular a decrease, is due to icing of the heat exchanger of the heat pump. The coolant volume flow and/or the performance of the coolant pump influence the cooling performance of the coolant heat exchanger. In the case of a low coolant volume flow or a low performance of the coolant pump, a lower cooling output and therefore a lower coolant temperature difference is usually expected, which difference therefore does not necessarily have to indicate icing of the heat exchanger. If, on the other hand, there is a change, in particular a decrease, in the coolant temperature difference or a change, in particular an increase, in the coolant outlet temperature with a high coolant volume flow or with a high performance of the coolant pump, this indicates icing of the heat exchanger of the heat pump.

It is further preferably provided that the cooling circuit is operated, preferably periodically, for the determination of the state of icing, the cooling circuit being further preferably operated over a specific period of time, even more preferably for less than 30 seconds, particularly preferably for less than 20 seconds for the determination of the state of icing.

In a motor vehicle, in particular an electric vehicle, a battery-electric vehicle or a hybrid electric vehicle, the cooling circuit for cooling the electric drives or the battery is not necessarily operated continuously. In order to be able to infer icing of the heat exchanger of the heat pump from the coolant outlet temperature or the coolant temperature difference, it can therefore be advantageous to operate the cooling circuit at least for a short time even when its cooling performance is not required for cooling the electric drives and/or the battery. The cooling circuit can therefore be operated at irregular intervals or at regular, in particular periodic, intervals.

It can advantageously be provided that a coolant temperature, in particular the coolant inlet temperature, is increased or decreased when the coolant temperature, in particular the coolant inlet temperature, corresponds approximately to an ambient temperature.

If the coolant temperature, for example the coolant inlet temperature, of the coolant of the cooling circuit is approximately at the temperature level of the ambient temperature, no heat transfer can take place. For the determination of the state of icing of the heat exchanger of the heat pump, it is therefore advantageous if the coolant temperature is raised or lowered. The increase of the coolant temperature can take place, for example, via a PTC (positive temperature coefficient) heating element or via a chiller, in particular a chiller of the heat pump. The cooling of the coolant can also take place using a chiller.

With a further advantage, it can be provided that a parameter is used to determine the state of icing, the parameter being an indicator of a current relative air speed of the ambient air in relation to the motor vehicle.

External influences which influence the relative air speed of the ambient air in relation to the motor vehicle also influence the air mass flow through the heat exchanger and through the coolant heat exchanger arranged in the same air path. This change in the air mass flow through the coolant heat exchanger can have an influence on the coolant outlet temperature or on the coolant temperature difference. By taking into account the parameter relating to a current relative air speed of the ambient air in relation to the motor vehicle, such influences can thus be included for the determination of the state of icing of the heat exchanger.

With a further advantage, it can be provided that the parameter is the current driving speed of the motor vehicle and/or that the parameter is the wind speed and/or the wind direction.

If the motor vehicle is moved at a high driving speed, the relative air speed of the ambient air in relation to the motor vehicle increases. As a result, the coolant outlet temperature can remain constant despite increased icing of the heat exchanger of the heat pump.

In a corresponding manner, the wind speed or the wind direction can also have an influence on the coolant outlet temperature or the coolant temperature difference. For this purpose, it is advantageous if the wind speed and/or the wind direction are used to determine the state of icing.

With a further advantage, it can be provided that the parameter is a distance signal, preferably a distance value, of the motor vehicle in relation to a vehicle traveling in front, and/or that the parameter is a vehicle position, the vehicle position preferably being a position of the motor vehicle in a road tunnel, in a valley, or in a street canyon.

Modern vehicles often have a so-called distance sensor system with which it can be determined whether the motor vehicle is behind a vehicle traveling in front. Some of these systems also determine the distance value, for example in meters. As a result of the shielding provided by a vehicle traveling in front, the air mass flow through the heat exchanger and the coolant heat exchanger can be changed, in particular reduced. It is therefore advantageous to take into account a distance signal, in particular a distance value, for the determination of the state of icing of the heat exchanger of the heat pump from the coolant outlet temperature or from the coolant temperature difference of the coolant heat exchanger.

Even if the motor vehicle is in a road tunnel, in a valley, or in a street canyon, the air mass flow through the heat exchanger and the coolant heat exchanger can change. It can therefore also be advantageous to also take into account the position of the motor vehicle for the determination of the state of icing of the heat exchanger of the heat pump. The position of the motor vehicle can be determined, for example, by means of a navigation system of the motor vehicle.

Furthermore, it can preferably be provided that a dew point temperature of the air at the heat exchanger is determined and/or that the defrosting process is only initiated when the temperature of the air at the heat exchanger falls below the dew point temperature.

By taking into account the dew point temperature and/or the temperature, it can be avoided that a defrosting process is initiated, even if no ice has formed on the heat exchanger.

With a further advantage, it can be provided that the air density and/or the outside air temperature and/or outside air humidity are taken into account for the determination of the state of icing of the heat exchanger.

With a further advantage, it can be provided that the parameter is an opening degree of a radiator shutter.

The radiator shutter, which is preferably arranged in front of the heat exchanger in the direction of flow in the motor vehicle, influences, depending on the opening degree, the air mass flow through the heat exchanger and through the coolant heat exchanger which is preferably arranged behind the heat exchanger. It is therefore advantageous if the opening degree of the radiator shutter is taken into account for the determination of the state of icing of the heat exchanger.

Another solution to the problem on which the invention is based is to provide a motor vehicle, in particular an electric vehicle, a battery-electric vehicle, or a hybrid electric vehicle, comprising a device for defrosting a heat exchanger of a heat pump of the motor vehicle, wherein the device has a computing unit which is designed to carry out the method described above.

The motor vehicle preferably has sensors for determining the coolant outlet temperature and, if necessary, the coolant inlet temperature, the coolant volume flow, and/or the performance of the coolant pump of the cooling circuit.

In addition, the motor vehicle can have a distance sensor system, sensors for the determination of the wind speed and/or wind direction, and/or a navigation system.

BRIEF DESCRIPTION OF THE DRAWINGS

The present invention is explained in more detail below with reference to the accompanying FIGURE.

FIG. 1 is a schematic representation of a motor vehicle with a heat exchanger of a heat pump and a coolant heat exchanger of a cooling circuit.

DETAILED DESCRIPTION OF THE INVENTION

A method 100 for initiating a defrosting process of a heat exchanger 10 of a heat pump 11 of a motor vehicle 200, which is only shown schematically, is explained with reference to FIG. 1. The motor vehicle 200 is designed as a battery-electric vehicle 12. The heat pump 11 of the motor vehicle 200 is used to heat a passenger compartment of the motor vehicle 200. A coolant heat exchanger 13 of a cooling circuit 14 for the electric drive and the battery of the motor vehicle 200 is arranged in the same air path 15 together with the heat exchanger 10 of the heat pump 11. In the cooling circuit 14, a first temperature sensor 16 is provided on the outlet side of the coolant heat exchanger 13, with which a coolant outlet temperature of the coolant from the coolant heat exchanger 13 is determined. In the cooling circuit 14, a second temperature sensor 17 for the determination of the coolant inlet temperature into the coolant heat exchanger 13 is also provided on the inlet side of the coolant heat exchanger 13. The sensor data of the first temperature sensor 16 and the second temperature sensor 17 are forwarded to a computing unit 18 of the motor vehicle 200, which computing unit calculates a coolant temperature difference from the coolant inlet temperature and the coolant outlet temperature and uses the coolant temperature difference and/or the coolant outlet temperature to determine a state of icing of the heat exchanger 10 of the heat pump 11. If icing of the heat exchanger 10 is present, a defrosting process of the heat exchanger 10 is initiated. For this purpose, methods known from the prior art, such as the use of a heating element 19, can be used.

In addition, the performance of a coolant pump 20 and a coolant volume flow in the cooling circuit 14 are determined by means of further sensors 21, 22 and transmitted to the computing device 18. The computing device 18 uses the determined performance of the coolant pump 20 and the determined coolant volume flow in addition to the coolant temperature difference and/or the coolant outlet temperature in order to infer the state of icing of the heat exchanger 10.

Since the cooling circuit 14 is usually not operated continuously to cool the electric drive or the battery of the motor vehicle 200, the computing device 18 is also designed to operate the cooling circuit 14 at periodic intervals, for example for a period of approximately 30 seconds, for the determination of the state of icing of the heat exchanger 10 of the heat pump 11. In the event that the coolant temperature in the cooling circuit 14 substantially corresponds to the ambient temperature so that no heat transfer can take place, the coolant temperature, in particular the coolant inlet temperature, can be increased by means of a PTC heating element 23.

In addition to the aforementioned parameters, the computing unit 18 can also use further parameters to determine the state of icing of the heat exchanger 10 of the heat pump 11. For example, the distance signals from a distance sensor system 24 can be used to determine a distance between the motor vehicle 200 and a vehicle traveling in front, and/or measured values from a sensor system 25 can be used to determine a wind speed. The motor vehicle 200 also comprises a navigation system 26, the information of which, which information relates to the position of the motor vehicle 200, can also be used to determine the state of icing of the heat exchanger 10.

LIST OF REFERENCE SIGNS

100 Method
200 Motor vehicle
10 Heat exchanger
11 Heat pump
12 Battery-electric vehicle
13 Coolant heat exchanger
14 Cooling circuit
15 Air path
16 First temperature sensor
17 Second temperature sensor
18 Computing unit
19 Heating element
20 Coolant pump
21 Sensor
22 Sensor
23 PTC heating element
24 Distance sensor system
25 Sensor system
26 Navigation system

The invention claimed is:

1. A method for initiating a defrosting process of a heat exchanger of a heat pump of a motor vehicle, wherein the heat exchanger and a coolant heat exchanger of a cooling circuit of the motor vehicle are arranged in a common air path, comprising:
determining a coolant outlet temperature of a coolant from the coolant heat exchanger of the cooling circuit,
increasing or decreasing the coolant temperature when the coolant temperature corresponds substantially to an ambient temperature
determining a state of icing of the heat exchanger of the heat pump using the coolant outlet temperature, and
initiating a defrosting process of the heat exchanger of the heat pump if icing of the heat exchanger is determined.

2. The method according to claim 1, wherein the state of icing of the heat exchanger of the heat pump is determined from a change in the coolant outlet temperature.

3. The method according to claim 2, wherein the change in the coolant outlet temperature is an increase.

4. The method according to claim 1, further comprising:
determining a coolant inlet temperature of the coolant in the coolant heat exchanger of the cooling circuit, and
determining a coolant temperature difference from the coolant inlet temperature and the coolant outlet temperature, and
wherein the state of icing of the heat exchanger of the heat pump is determined from a change in the coolant temperature difference.

5. The method according to claim 4, wherein the change in the coolant temperature difference is a decrease.

6. The method according to claim 4, wherein the coolant temperature is a coolant inlet temperature.

7. The method according to claim 1,
further comprising determining a coolant volume flow and/or a performance of a coolant pump of the cooling circuit,
wherein the coolant volume flow and/or the performance of the coolant pump is used to determine the state of icing of the heat exchanger.

8. The method according to claim 1, wherein the cooling circuit is operated for the determination of the state of icing, and the cooling circuit is operated over a specific period of time for the determination of the state of icing.

9. The method according to claim 8, wherein the specific period of time is less than 30 seconds.

10. The method according to claim 1, wherein a parameter is used to determine the state of icing, and wherein the parameter is an indicator of a current relative air speed of the ambient air in relation to the motor vehicle.

11. The method according to claim 10, wherein the parameter is the current driving speed of the motor vehicle, the wind speed and/or the wind direction.

12. The method according to claim 10, wherein the parameter is a distance signa.

13. The method according to claim 12, wherein the distance signal is the distance value is of the motor vehicle in relation to a vehicle traveling in front of the motor vehicle.

14. The method according to claim 10, wherein the parameter is a vehicle position.

15. The method according to claim 14, wherein the vehicle position is a position of the motor vehicle in a road tunnel, in a valley, or in a street canyon.

16. The method according to claim 1, wherein the motor vehicle is an electric vehicle, a battery-electric vehicle or a hybrid electric vehicle.

17. A motor vehicle, comprising:
a device for defrosting a heat exchanger of a heat pump of the motor vehicle, wherein the heat exchanger and a coolant heat exchanger of a cooling circuit of the motor vehicle are arranged in a common air path,
wherein the device has a computing unit that is configured to carry out a method comprising:
increasing or decreasing the coolant temperature when the coolant temperature corresponds substantially to an ambient temperature
determining a coolant outlet temperature of a coolant from the coolant heat exchanger of the cooling circuit,
determining a state of icing of the heat exchanger of the heat pump using the coolant outlet temperature, and
initiating a defrosting process of the heat exchanger of the heat pump if icing of the heat exchanger is determined.

* * * * *